US005392504A

United States Patent [19]

Calusinski

[11] Patent Number: 5,392,504
[45] Date of Patent: Feb. 28, 1995

[54] SPRING CLIP REMOVER AND REMOVAL METHOD

[75] Inventor: Richard R. Calusinski, Vista, Australia

[73] Assignee: Everts & Van Der Weijden Exploitatie Maatschappij Ewen B.V., The Hague, Netherlands

[21] Appl. No.: 205,998

[22] Filed: Mar. 4, 1994

[51] Int. Cl.$^{6}$ .............................................. B23P 19/00
[52] U.S. Cl. ..................................... 29/426.6; 29/225; 29/229; 29/254
[58] Field of Search .................. 29/426.6, 243.56, 225, 29/229, 254, 426.5

[56] References Cited

U.S. PATENT DOCUMENTS

| | | | |
|---|---|---|---|
| 1,873,294 | 8/1932 | Cosgrove | 29/254 |
| 4,454,792 | 1/1984 | Burris | 29/254 |
| 5,140,741 | 8/1992 | Bible | 29/426.6 |

FOREIGN PATENT DOCUMENTS

| | | | |
|---|---|---|---|
| 919858 | 4/1982 | U.S.S.R. | 29/225 |

*Primary Examiner*—Mark Rosenbaum
*Assistant Examiner*—David P. Bryant
*Attorney, Agent, or Firm*—Perman & Green

[57] ABSTRACT

The present invention relates to a tool (10) used for the removal of retained spring clips on railway tracks. The tool is characterized by a body (12) and a handle (14), the body having clip engaging means (22) adapted to engage outer edges of a retained clip and the handle including means (24) capable of delivering an impact to the body, the clip engaging means being adapted to compress the outer edges of the clip so as to permit passage of the clip through a gate retaining the clip to thereby release the clip. The invention also discloses a protective shroud (30) used to protect an operator of the tool from injury caused by movement of the clip when released.

11 Claims, 3 Drawing Sheets

SPRING CLIP REMOVER AND REMOVAL METHOD

TECHNICAL FIELD

The present invention relates to a tool for removing elastic rail fasteners, commonly referred to as spring clips from rail track. These clips secure the rail section to the sleeper and can be used in insulated or non-insulated track on either concrete, steel or timber sleeper assemblies, or on continuously cast deck trade.

BACKGROUND ART

Spring clips are used to fasten rail to sleepers or rail seat assemblies and are available in various geometries. The present invention applies to a removal tool suitable for use on clips of the general characteristics as displayed in the accompanying drawings. That is the clip prongs (or toes) need to be drawn together before they can be forced through a 'Gate' in the securing shoulder to finally remove the clip. The clips holding force (toe load) being released during this removing phase.

There are currently two basic methods of removing these types of clips:

Firstly a mechanism which forces the prongs together and then pulls the clip off from the rear of the clip available in manual and automated formats and, a mechanism consisting of a wedge which fits in front of the prongs and is driven downwards by hammer.

The wedging action pushes the clip out at the prongs. This service is available in a manual format requiring two operators, one to hold the wedge in position and the other to drive the hammer.

In both cases the tools are slow (particularly in manual mode), uneconomical and can be dangerous. The existing manual tool in method 1 for example is an expensive articulated unit which hinges about the rear of the shoulder on removal, requiring a large rotational action accompanied by a severe 'Jerk' to force the clip off. In method 2 the clip is ejected at high speed and can cause severe injury on contact.

DISCLOSURE OF THE INVENTION

The present invention seeks to address the above problems by providing a tool useful for removing a retained spring clip in which the task can be completed successfully with only a single operator. Moreover, by using a tool as described below, the operator is able to stand behind the clip out of line of the direction of travel of the clip, that is from a position of relative safety.

Thus, according to one aspect of the present invention there is provided a tool useful for removing a retained spring clip characterised by a body and a handle, the body having clip engaging means adapted to engage outer edges of a retained clip and the handle including means capable of delivering an impact to the body, the clip engaging means being adapted to compress the outer edges of the clip so as to permit passage of the clip through a gate retaining the clip to thereby release the clip.

In preference, the clip engaging means comprises a recess formed in a front face of the body.

In preference the tool further includes an arcuate shock absorbent shroud attached to the handle and adapted to fit around a retained clip.

The means for delivering an impact to the body may include manually or mechanically activated means such as an impact hammer or hydraulic impact means. Alternatively, the means for delivering an impact may be supplied from an automatic track laying device.

It will be appreciated by those skilled in the art that a variety of means to produce an impact on the body could be envisaged. Thus in any particular situation the choice of means to provide an impact will reflect the facilities available and the extent to which the tool could be used and the skill of those using it. A controlled hydraulic means of delivering an impact could be preferred because of the ability to apply only sufficient impact to release the clip and therefore avoid any excessive force.

By incorporating a means capable of delivering an impact to the body as a part of the handle of the tool of the present invention the tool may be operated to remove a retained clip by a single operator. Also the tool of the present invention permits the operator to stand in a position well clear of the likely trajectory of a released clip.

BRIEF DESCRIPTION OF THE DRAWINGS

The present invention will now be described, by way of an illustrative non-limiting example, with reference to the accompanying drawings in which.

DESCRIPTION OF THE PREFERRED EMBODIMENT

Figure 1:
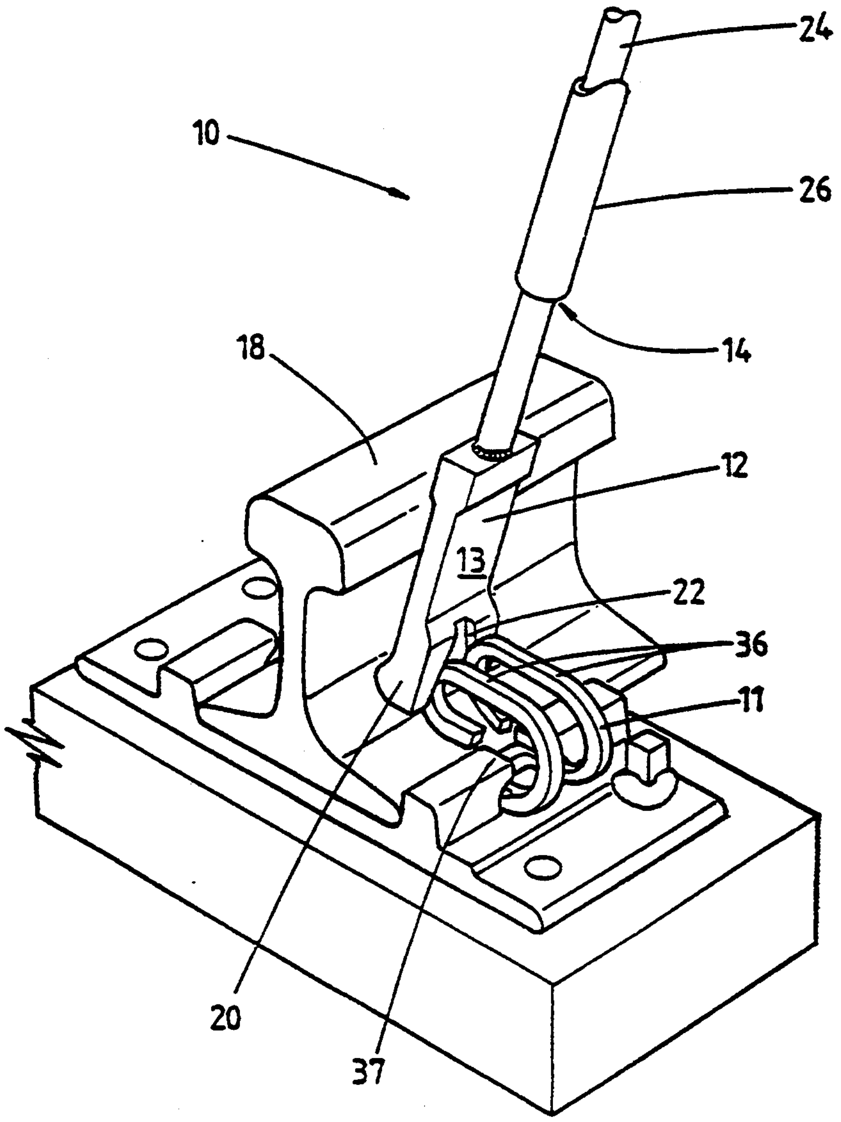
FIG. 1 illustrates schematically a tool useful for removing a retained spring clip in accordance with a first aspect of the present invention.

As shown in FIG. 1 is a tool 10 useful for removing a retained spring clip 11. The tool 10 comprises a body 12 and handle 14. Attached to the handle 14 is a means for delivering an impact to the body 12 comprising a sliding impact hammer 26.

Figure 4:
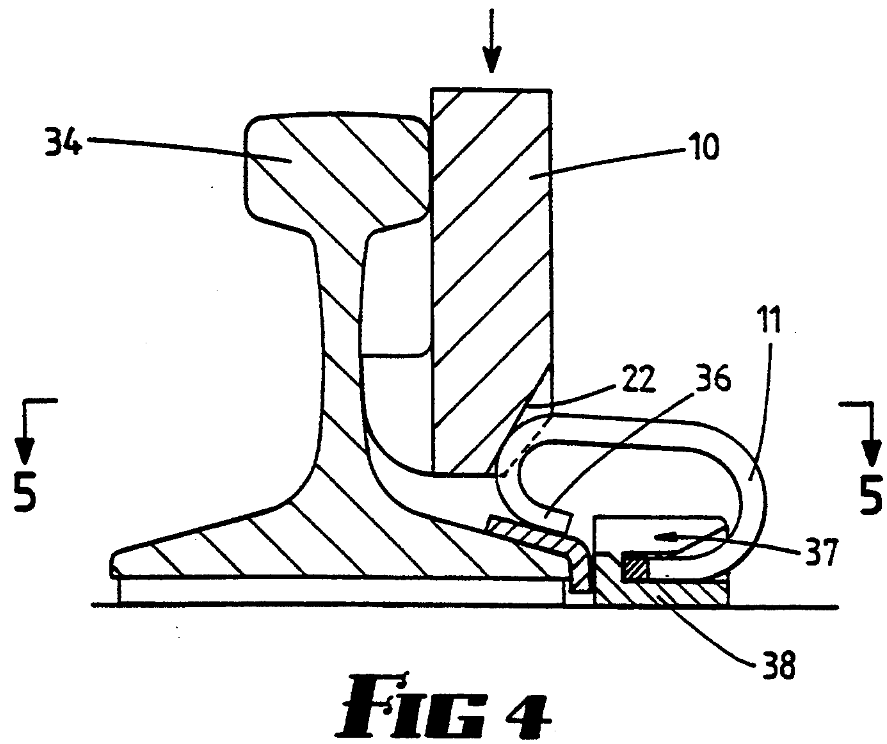
FIG. 4 illustrates in cross section the position of the body of a tool of the present invention.

The body 12 comprises a wedge having a flattened front face 13. The body 12 is adapted to be fitted between rail track 18 and the outer edges of the clip 11 as shown in FIG. 4. At its lower most end the body 12 has a bulbous portion 20 extending rearwardly therefrom the bulbous portion 20 is adapted to engage and bear against the inner surface of the rail track 18, so as to secure the tool 10 in position.

The front face 13 of the body 12 has a recess 22 located at a lower end thereof. The recess 22 is adapted to fit around the outer longitudinal edges of the clip 11, and edges of the recess 22 are inclined towards each other so as to form a triangular recess.

A recess (not shown) is also cut into rear face of the body 12. This effect of this latter recess is to reduce the overall weight of the body 12 and therefore the tool 10.

The handle 14 is aligned with a longitudinal axis of the body 12 and extends generally upwardly therefrom. The handle 14 is formed of a tubular inner section 24. A generally tubular outer section 26 is slidingly inserted over the inner section 24. The outer section 26 is able to move freely over the inner section 24. The outer section 26 functions as an impact hammer 26.

Figure 3:
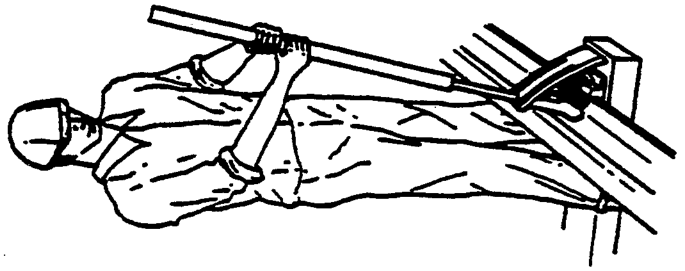
FIG. 3 illustrates the embodiment of FIG. 2 in use.
Figure 2:
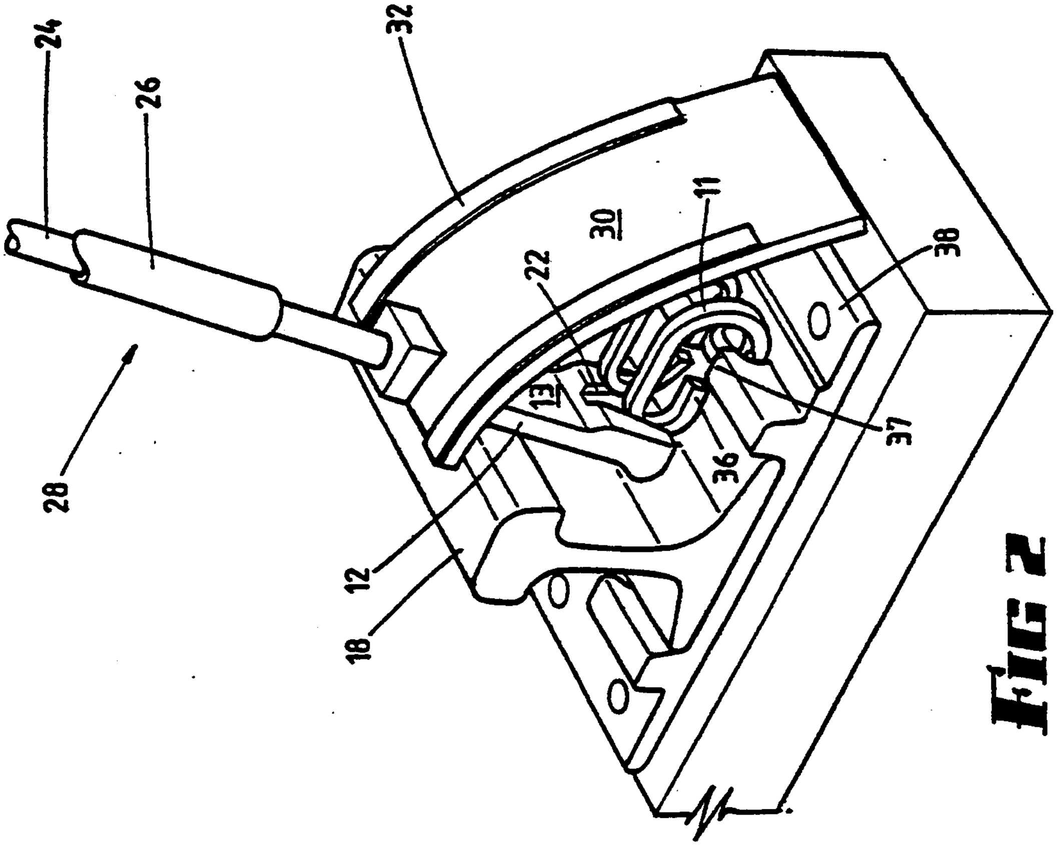
FIG. 2 illustrates a second embodiment of a tool for removing a retained spring clip.

A second embodiment of the present invention is shown in FIGS. 2 and 3.

Shown in FIGS. 2 and 3 is a tool 28 for removing a retained spring clip 11. The embodiment shown in FIGS. 2 and 3 includes many of the features described for the tool 10 and like numerals will be used to describe like parts.

The tool 28 includes a body 12 and a handle 14. Additionally, the tool 28 incorporates a protective shroud 30. The shroud 30 is located at the junction of the body 12 and handle 14 and comprises an arcuate cover formed of elastomeric materials with bound metal edges 32. The shroud 30 extends forwardly of the body 12 so as to entirely cover the spring clip 11.

Figure 5:
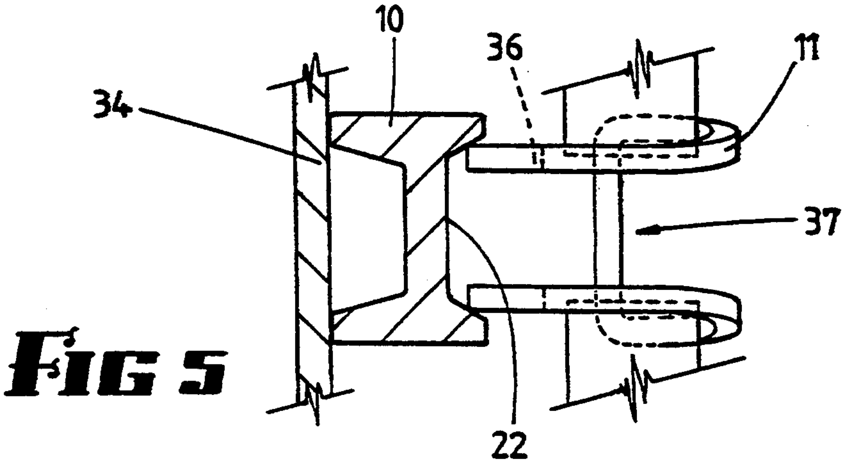
FIG. 5 illustrates a section taken through the line 5' to 5' from FIG. 4.
Figure 6:
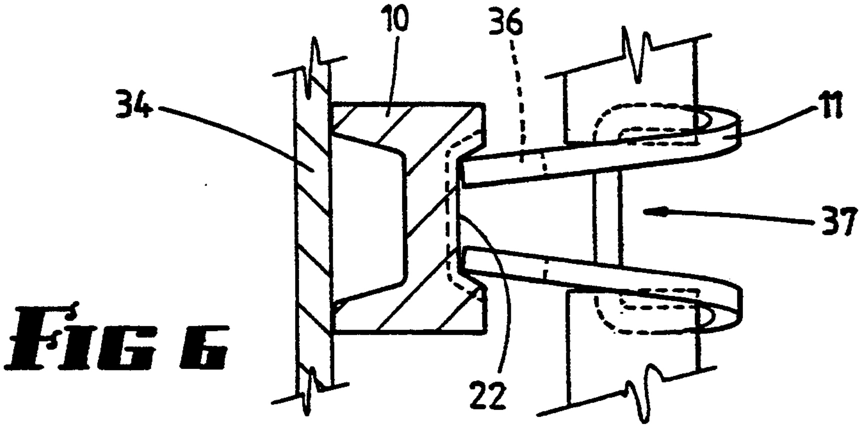
FIG. 6 illustrates a section of FIG. 5 as the tool is used.

The use of the tool 10 or 30 will be described with reference to FIGS. 4 to 6.

Shown in FIG. 4 in cross section is a spring clip and railway track assembly. The clip 11 is shown in position retaining a rail 34 in position. As can be clearly seen in FIG. 5 outer toes 36 of the clip 11 rest so as to be outside of a gate 37 in the rail shoulder 38. The tool 10, 28 is fitted into position between the uprights of the rail 34 and the clip 11 such that the recess 22 is fitted around the toes 36. This is shown in cross section in FIG. 5.

The outer tube 26 of the handle 14 is used in a manner of an impact hammer to create a downward force of the body 12 thereby forcing the toes 36 of the clip 11 through the recess 22. As the body moves downwardly over the clip the toes 36 are compressed as shown cross sectionally in FIG. 6. Eventually the toes 36 are compressed sufficiently to clear the gate 37 in the shoulder, the tool 10 may then be used to push the clip 11 through the gate 37. The bulbous portion 20 is useful in that, by bearing against the rail track the clip may be urged forwardly through the gate 37.

In the embodiment shown in the drawings, a particular type of clip is shown. However other types of clip are also available, these other types including substantially more solid clips. The toes of a substantially more solid clip require a considerably greater force to produce the compression necessary to release the clip. In such cases, the means capable of delivering an impact to the body would be modified so as to be able to produce a sufficient impact. Using a hydraulic impact means this would, of course be readily achievable.

As may well be imaged the shroud 30 is useful for restricting any undesirably excessive movement of the clip 11.

Also as can be seen in FIG. 3 the tool 10, 30 is readily operated with an operator standing behind the clip 11 thereby being protected from any unwanted impact with a clip 11. It can also be seen that the tool 10, 30 is easily operated by a single person.

The claims defining the invention are as follows:

1. A tool useful for removing a spring clip retained on a rail track by having outer edges of the clip retained outside of a gate, the tool including:

a body having a recess formed in the front face thereof, the recess serving as clip engaging means, and a bulbous portion extending rearwardly from a lower end of the body, said bulbous portion being adapted to bear against an inner surface of the rail track; and a handle including an impact hammer, said impact hammer comprising an open ended tube located around the handle and slidable over a longitudinal axis of the handle to thereby deliver an impact to the body, the clip engaging means being adapted to engage and compress outer edges of the clip in response to an impact delivered to the body from the impact hammer so as to permit passage of the outer edges and body of the clip through the gate to thereby release the clip; and the tool further including a shroud attached to the tool and located so as to pass over the clip and the body to protect the operator of the tool.

2. A tool according to claim 1, wherein the impact hammer is adapted to be manually or hydraulically operated.

3. A tool according to claim 1, wherein the tool is connected to an automatic track laying device, the track laying device having means capable of acting as an impact hammer.

4. A tool according to claim 1, wherein the shroud means comprises an arcuate cover of elastomeric material attached to an upper portion of the body of the tool and extending over a retained clip forming a barrier between a retained clip and the operator to thereby protect the operator.

5. A method of removing a spring clip retained on a rail track by having outer edges of the clip retained outside of a gate, the method comprising steps of:

providing a tool having a body and a handle, the body having a recess formed in the front face thereof, the recess serving as a clip engaging means, and a bulbous portion extending rearwardly from a lower end of the body, said bulbous portion being adapted to bear against an inner surface of the rail track, the handle including an impact hammer, said impact hammer comprising an open ended tube located around the handle and slidable over a longitudinal axis of the handle to thereby deliver an impact to the body, the clip engaging means being adapted to engage and compress outer edges of the clip in response to an impact delivered to the body from the impact hammer so as to permit passage of the outer edges and body of the clip through the gate to thereby release the clip, and the tool further including a shroud attached to the tool and located so as to pass over the clip and the body to protect the operator of the tool;

engaging the clip in the recess formed in the front face of the tool; and delivering an impact to the tool with the impact hammer to thereby engage and compress the outer edges of the clip so as to permit passage of the outer edges and body of the clip through the gate to thereby release one clip, the shroud serving to limit the travel of the release clip and protect the operator from the clip.

6. A tool for removing a retained spring clip comprising:

a body having clip engaging means adapted to engage outer edges of a retained clip; and a handle including means capable of delivering an impact to the body, the means capable of delivering an impact including an impact hammer having an open ended tube located around the handle and slidable over a longitudinal axis of the handle to thereby deliver an impact to the body, the clip engaging means being adapted to compress the outer edges of the clip in response to an impact delivered to the body from the handle so as to permit passage of the clip through a gate retaining the clip to thereby release the clip.

7. A tool according to claim 6, characterized in that the clip engaging means comprises a recess formed in a front face of the body.

8. A tool according to claim 7, characterized in that the recess formed in the front face of the body has sides inclined so as to meet at a point at an upper end thereof, wherein outer edges of a clip engaged by the recess may be compressed in response to an impact delivered to the body from the handle by progressive downward movement of the body over the clip and movement of the edges of the clip within the recess.

9. A tool according to claim 6, characterized in that the body has a bulbous portion extending rearwardly from a lower end thereof, said bulbous portion being adapted to engage and bear against an inner surface of a rail track so as to be able to force a compressed retained clip to thereby release the clip.

10. A tool according to claim 6, characterized in that the tool additionally comprises resilient shroud means for restricting the movement of a released clip and forming a barrier between an operator of the tool and the clip.

11. A tool according to claim 10, characterized in that the shroud means is an arcuate cover of elastomeric material attached to an upper portion of the body of the tool and extending over a retained clip thereby forming a barrier between the clip and an operator.

* * * * *